No. 624,122. Patented May 2, 1899.
H. M. STEVENSON.
SPIRAL TOOL DRIVER.
(Application filed June 2, 1898.)
(No Model.)
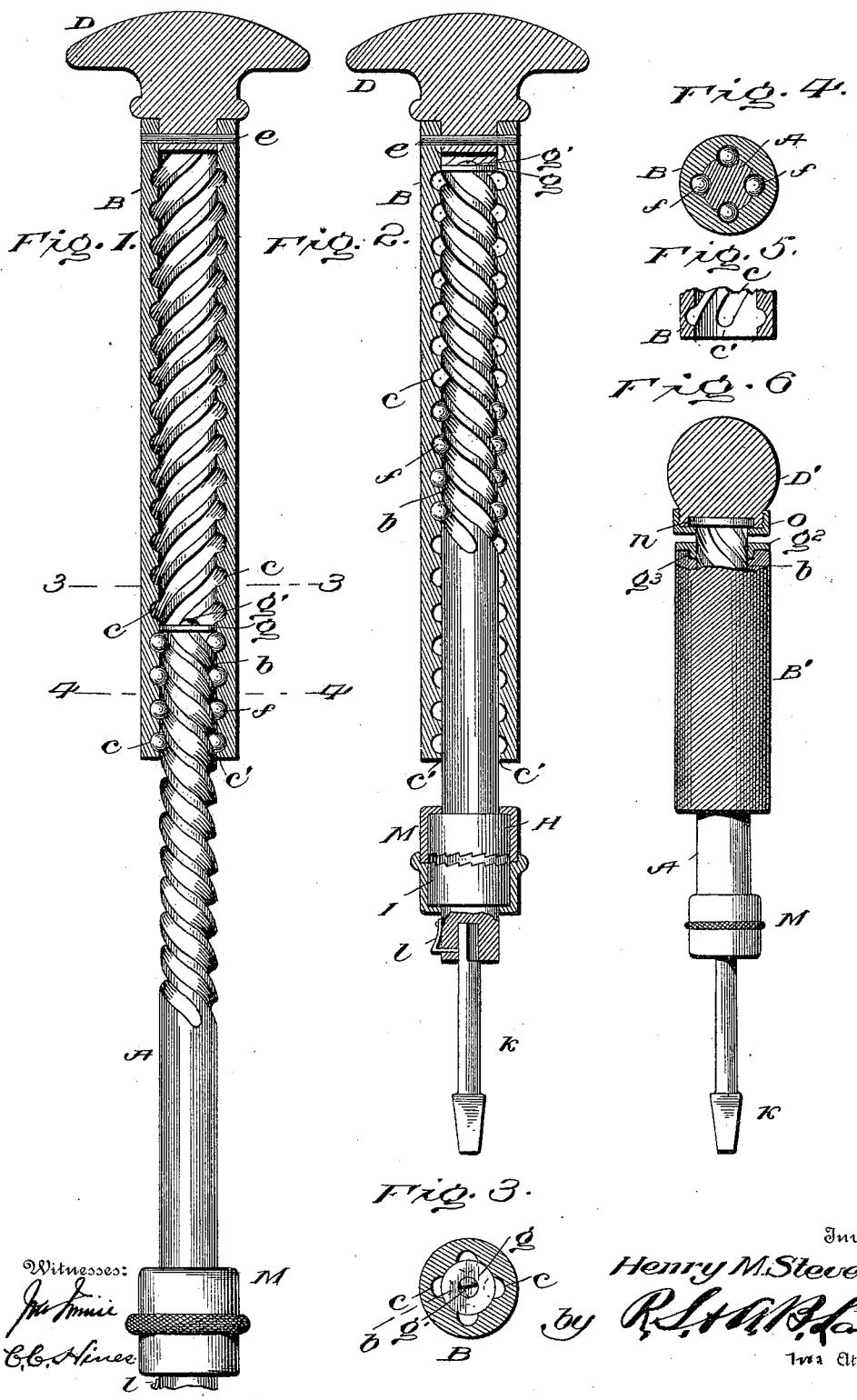

UNITED STATES PATENT OFFICE.

HENRY M. STEVENSON, OF PERRY, IOWA.

SPIRAL TOOL-DRIVER.

SPECIFICATION forming part of Letters Patent No. 624,122, dated May 2, 1899.

Application filed June 2, 1898. Serial No. 682,396. (No model.)

*To all whom it may concern:*

Be it known that I, HENRY M. STEVENSON, a citizen of the United States, residing at Perry, in the county of Dallas and State of Iowa, have invented certain new and useful Improvements in Spiral Tool-Drivers; and I do hereby declare the following to be a full, clear, and exact description of the invention, such as will enable others skilled in the art to which it appertains to make and use the same.

This invention relates to spiral tool-drivers; and the object thereof is to provide a simple and effective tool-driver of this character consisting of an externally spirally grooved spindle, a chuck having a clutch connection therewith, an internally spirally grooved sleeve, and a series of balls interposed between the spindle and sleeve and adapted to traverse the said grooves and impart rotary motion to the spindle when said sleeve is reciprocated.

A further object is to so combine and arrange the parts of the tool that the balls serve, in addition to their function of power-transmitters, as antifriction-bearings, whereby objectionable twist and strain is avoided and a tool provided which may be easily and conveniently operated.

With these and other objects in view the invention consists in the features and in the novel construction and arrangement of parts hereinafter more fully described, and specifically set forth in the appended claims, reference being had to the accompanying drawings, forming a part of this specification, and in which—

Figure 1 is a longitudinal section of a spiral tool-driver constructed in accordance with my invention, showing the parts of the tool in their normal operative positions with the handle or sleeve drawn out to the limit of its stroke. Fig. 2 is a similar view showing the position of the parts when the sleeve has been pushed forward to the limit of its stroke to rotate the spindle and tool-bit to the right. Fig. 3 is a sectional plan view of the tool, taken on line 3 3 of Fig. 1. Fig. 4 is a similar view taken on line 4 4 of Fig. 1. Fig. 5 is a detail sectional view of the inner or tool end of the sleeve. Fig. 6 is a part sectional and a part side elevational view of a modified form of tool-driver.

Referring now more particularly to the drawings, wherein like letters of reference designate corresponding parts throughout the several views, A represents a shaft or spindle to which rotary motion is to be imparted, and this spindle is formed with a series of circumferential spiral grooves $b$, semicircular in cross-section and extending on such a pitch as to permit turning of the spindle by pressure directed longitudinally thereof against the sides of the grooves. The outer end of the spindle passes into the inner end of a tubular reciprocating handle or sleeve B, which is formed with internal spiral grooves $c$ of the same pitch and equal in number to the grooves in the spindle and semicircular in cross-section, so that they will form therewith raceways which are circular in cross-section. The grooves $c$ terminate short of the inner or tool end of the sleeve to cause the formation of shoulders $c'$, and fitted into the outer end of said sleeve is a knob or hand-grasp D, which may be of any approved form and detachably secured thereto in any desired manner. In the present instance the knob is shown secured by a removable pin $e$.

Interposed between the spindle and sleeve are a series of antifriction-balls $f$, which fit partly within the spiral grooves in the spindle and partly within the corresponding spiral grooves in the sleeve and are free to travel in the raceways formed thereby in a direction londitudinally of the tool when the sleeve is reciprocated. In other words, the balls may be said to travel toward or from the outer end of the spindle and inner end of the sleeve simultaneously in one direction or the other, and in thus traveling as the sleeve is firmly held against rotation by the hand of the operator the power imparted to the balls by reciprocating said sleeve is transmitted to the spindle, which is thereby rapidly rotated.

By reference to Figs. 1 and 2 it will be seen that the spiral grooves are longer than the series of balls and that the latter in the present instance completely fill the grooves for a distance equal to about one-third of the length of the grooved portion of the spindle and one-fifth of the length of the grooved portion of the sleeve. This arrangement, while deemed preferable, is not absolutely essential and may be varied to some extent to suit varying conditions; but it is essential in all cases to have the series of balls shorter than the grooves, so as to cause the balls to travel back and forth in the manner described without the use of a back channel or return-passage. Fig. 1 shows the position of the parts when the tool is ready for operation, the balls being located at the inner or tool end of the sleeve and outer end of the spindle. When the sleeve is reciprocated inwardly or forced down on the spindle, the balls travel in the raceways formed by the grooves toward the inner end of the spindle and outer end of the sleeve and rotate the spindle to the right, and when the limit of the stroke is reached the outer end of the spindle occupies a position near the extreme outer end of the sleeve and the balls at the center thereof, as shown in Fig. 2. When the sleeve is withdrawn or reciprocated outwardly, however, the spindle is rotated to the left and the balls travel in the reverse direction until the limit of the stroke is reached, when the parts are restored to the normal positions (shown in Fig. 1) in readiness to be operated to again rotate the spindle to the right. It will thus be seen that when the sleeve is forced down on the spindle the balls travel as fast up the sleeve as they travel down the spindle, and vice versa when the sleeve is withdrawn, and that the full stroke equals the full sum of these two travels. The spiral grooves therefore need not extend the full length of either the sleeve or spindle; but the sleeve is preferably grooved throughout its entire length when employed in connection with a spindle grooved as shown in order to enable the balls to be readily inserted and removed at the outer end thereof. If desired, however, the spindle may be grooved at its inner or lower half only or throughout its entire length and the normal positions of the balls varied accordingly. It will also be apparent that by employing loose balls and constructing the parts so that said balls travel freely in the grooves the objectionable twisting and straining incident to the use of a relatively-fixed member on the sleeve is almost, if not entirely, obviated, an antifriction-bearing afforded, and a tool produced which may be much more readily and easily operated.

When the parts of the tool are assembled, the balls are slipped into the grooves at the outer end of the spindle. A plate or cap $g$ is then detachably secured to the spindle by a screw $g'$ to limit the movement of the balls in one direction, while the shoulders $c'$ at the inner end of the sleeve limit the movement of the balls in the reverse direction and prevent the same from dropping out at that point.

The inner or tool end of the spindle is formed with a clutch-head H, which is adapted to engage a similar clutch-head I on the inner end of a tool-holding chuck J. This chuck is provided with an opening for the reception of a screw-driver, auger, drill, or other bit, as $k$, and a spring catch or detent $l$ to hold the same in position. The said two clutch-heads are inclosed within a two-part casing M, which is employed, as usual, as a handhold to enable the operator to properly steady and center the tool. When the sleeve is pushed inward, the clutch-heads are engaged and the bit is rotated to the right with the spindle; but when the sleeve is drawn outward and the spindle rotated to the left the clutch-heads are released from engagement and the bit remains stationary, as in the ordinary construction of tools of this class.

In the modification shown in Fig. 6 the mode of operation of the parts is essentially the same; but the construction is varied to a slight extent by extending the end of the spindle through the outer end of the sleeve and forming it with a flange $n$. The knob D', in this instance, is in the form of a head screw-threaded at its base to engage a loose collar $o$, encompassing the spindle and retained in position thereon by the said flange $n$. The ball-retaining cap $g^2$ is also in the form of a ring having a pendent flange $g^3$, which is threaded into the upper end of the sleeve instead of being connected to the cap. The collar $o$ allows the spindle to rotate freely independent of the knob and permits of the knob being held stationary in the hand to center the tool when the spindle is rotated.

Changes in the form, proportion, and minor details of construction other than those specified herein may be made within the scope of the invention without departing from the spirit or sacrificing any of the advantages thereof.

The invention is not restricted to use in connection with a spiral tool-driver, although so shown and described in the present instance, but may be employed generally in machinery for converting reciprocatory into rotary motion.

Having thus described my invention, what I claim as new, and desire to secure by Letters Patent, is—

1. The combination of a shaft or spindle provided with external spiral grooves, a reciprocating sleeve provided with internal spiral grooves extending on the same pitch as the grooves in the spindle, and a series of balls loosely fitting partly within the grooves in the spindle and partly within the grooves in the sleeve, said series of balls being shorter than said grooves and free to travel therein when the sleeve is reciprocated, whereby the balls are also reciprocated, substantially as described.

2. In a spiral tool-driver, the combination of a spindle provided with a series of external spiral grooves, a reciprocating sleeve provided with a series of internal spiral grooves equal in number to those in the spindle, and a series of balls loosely fitting partly within the grooves in the spindle and partly within the grooves in the sleeve, said series of balls being shorter than the grooves and arranged normally at the inner end of said sleeve and adapted to traverse the grooves toward the inner end of the spindle and outer end of the sleeve when said sleeve is reciprocated, substantially as described.

3. In a spiral tool-driver, the combination of a revoluble spindle provided with a series of external spiral grooves, a reciprocating sleeve provided with internal grooves and with a detachable handle or knob closing the outer end thereof, a series of balls in said grooves and free to traverse the same toward and from the outer end of the spindle and inner end of the sleeve, said series of balls being shorter than each of the grooves by an amount equal to one-half the stroke, and a plate or cap detachably secured to the said outer end of the spindle to hold the balls confined, substantially as described.

4. The combination of a shaft or spindle provided with external spiral grooves, a reciprocating sleeve provided with internal spiral grooves, a series of balls shorter than said grooves by an amount approximately equal to one-half the stroke and fitted loosely to travel therein when the sleeve is reciprocated, means at the inner end of the sleeve to prevent the balls from escaping at that point, and a plate or cap to prevent the escape of the balls at the outer end of said sleeve, substantially as described.

In testimony whereof I affix my signature in presence of two witnesses.

HENRY M. STEVENSON.

Witnesses:
 LEW. GRISWOLD,
 ELI BROTHERSON.